US005780574A

United States Patent [19]

Hanabusa

[11] Patent Number: 5,780,574
[45] Date of Patent: Jul. 14, 1998

[54] FLAME-RETARDANT POLYESTER RESIN COMPOSITION

[75] Inventor: Kazuhito Hanabusa, Shizuoka, Japan

[73] Assignee: Polyplastics Co., Ltd., Japan

[21] Appl. No.: 816,450

[22] Filed: Mar. 12, 1997

[30] Foreign Application Priority Data

Mar. 14, 1996 [JP] Japan ............... 8-057225

[51] Int. Cl.$^6$ ............... C08G 63/00
[52] U.S. Cl. ............... 528/272; 528/176; 528/193; 528/194; 528/271
[58] Field of Search ............... 528/176, 193, 528/194, 271, 272

[56] References Cited

U.S. PATENT DOCUMENTS 5,352,534 10/1994 Hamano et al. ............... 428/480
5,407,752 4/1995 Fukuzumi et al. ............... 428/480

*Primary Examiner*—Terressa Mosley
*Attorney, Agent, or Firm*—Nixon & Vanderhye PC

[57] ABSTRACT

To provide a flame-retardant polyester resin composition excellent in moldability and capable of keeping its excellent contact properties stable for a long period of time when it is molded into an electric component such as a relay or switch.

100 parts by weight of a polyester resin (a) comprising as the main constituents an aromatic or aliphatic dicarboxylic acid and an aliphatic diol, each end of which is substituted with a monofunctional compound having a carboxyl or hydroxyl group, the amount of the hydroxyl end group being 40 meq/kg or below, is blended with 1 to 50 parts by weight of a specified halogenated phenoxy compound (B), 0.1 to 30 parts by weight of an antimony compound (C), and 0 to 150 parts by weight of an inorganic filler (D).

5 Claims, No Drawings

FLAME-RETARDANT POLYESTER RESIN COMPOSITION

BACKGROUND OF INVENTION

The present invention relates to a flame-retardant polyester resin composition. More specifically, it relates to a resin composition having a performance by which good contact properties can stably be maintained for a long period of time in the case that electrical parts such as relays and switches are made of the resin composition, and having excellent moldability and workability.

PRIOR ART

Aromatic polyesters typified by polybutylene terephthalate (PBT) have been widely utilized in uses of automotive parts as well as electrical and electronic parts as molding materials from the viewpoints of excellent moldability, mechanical properties and electrical properties. On the other hand, the materials for these uses are strongly required to have not only a balance between general chemical and physical properties but also a safety to a fire, i.e., flame retardancy.

As a means for imparting the flame retardancy to the polybutylene terephthalate, there is known a method of utilizing an organic halogen compound such as decabromodiphenyl ether or brominated polycarbonate, or further simultaneously using antimony trioxide, as a flame retardant. However, the PBT composition in which this kind of flame retardant is blended causes thermal decomposition at a high temperature or during a long-term use to easily generate a gas, and particularly under conditions that an electrical contact is present nearby, this gas is carbonized by arc discharge and the carbonized substance is then deposited, which leads to an anomalous continuity. In particular, this problem is remarkable in the case of a low-molecular weight compound which is excellent in fluidity, and it has been difficult to achieve both of the high fluidity and the decrease of the amount of the generated gas.

The present inventors have already suggested a method which comprises adding a halogenated phenoxy resin and a specific aliphatic ester together to a high-molecular weight PBT in JP-A 4-351657 for the purpose of solving the above-mentioned problem.

However, in the case that the amount of a lubricant is increased to supplement the fluidity as described above and to satisfy the requirement of the higher fluidity in recent years, evils such as the deterioration of mechanical properties and the deterioration of durability take place. For this reason, it has been difficult to achieve both of the high fluidity and the reduction of the generated gas.

SUMMARY OF INVENTION

The present inventors have intensively investigated with the intention of obtaining a flame-retardant polyester resin composition having characteristics desired as materials for parts having electrical contacts, i.e., characteristics that the amount of a generated organic gas is reduced, the generation of another corrosive gas is restrained, corrosive properties to a contact metal during a long period of time are low, fluidity is good, and moldability is excellent. As a result, the present invention has now been completed.

The present invention relates to A flame-retardant polyester resin composition comprising:

(A) 100 parts by weight of a polyester resin comprising as the main constituents an aromatic dicarboxylic acid or an aliphatic dicarboxylic acid and an aliphatic diol, each end of which is substituted with a monofunctional compound having a carboxyl group or a hydroxyl group, the amount of the hydroxyl end group being 40 meq/kg or below, (B) 1 to 50 parts by weight of a halogenated phenoxy compound having repeating units represented by the formula (1), the number-average degree of polymerization thereof being 6 to 50:

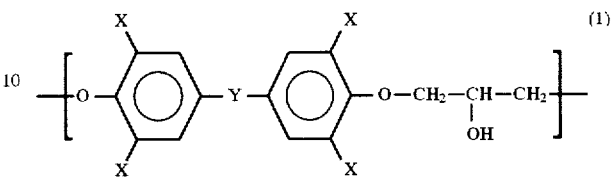

wherein X represents Br or Cl, and Y represents $C_{1-10}$ alkylene group, $C_{1-10}$ alkylidene group, $C_{3-10}$ cycloalkane group, carbonyl group, —O—, —S— or —SO$_2$—.

(C) 0.1 to 30 parts by weight of an antimony compound, and (D) 0 to 150 parts by weight of an inorganic filler.

DETAILED DESCRIPTION

Next, the constituents of a composition according to the present invention will be described in detail.

In the first place, the characteristic of the present invention is that a polyester resin having a hydroxyl end group amount of 40 meq/kg or less is used.

A polyester resin (A) used in the present invention may be prepared so that an aromatic dicarboxylic acid or an aliphatic dicarboxylic acid and an aliphatic diol may be contained as the main constituents, its terminal may be substituted by a monofunctional compound having a carboxyl group or a hydroxyl group, and a hydroxyl end group amount in the resin may be 40 meq/kg or less.

As material monomers formed the main skeleton of the polyester resin, there can also be used, in addition to the dicarboxylic acid and the diol, derivatives capable of forming an ester thereof. Here, typical examples of the aromatic dicarboxylic acid, the aliphatic dicarboxylic acid and the derivative capable of forming the ester thereof include terephthalic acid, isophthalic acid, phthalic acid, naphthalenedicarboxylic acid, biphenyldicarboxylic acid, stilbenedicarboxylic acid, 2,2-(biphenylcarboxyphenyl)propane, succinic acid, adipic acid, sebacic acid and dodecanedicarboxylic acid and their ester-formable derivatives such as alkyl esters. Furthermore, typical examples of the aliphatic diol include ethylene glycol, 1,3-propanediol, 1,4-butanediol, 1,6-hexanediol, diethylene glycol, triethylene glycol and cyclohexanedimethanol. In the present invention, so long as the dicarboxylic acid and the diol are used as the main components, a polyester resin copolymerized with another component may also be acceptable.

In the present invention, among the above-mentioned polyester resins, the effect of a terminal substitution by the following specific monofunctional compound to the polybutylene terephthalate resin containing terephthalic acid and butanediol as the main components and the polybutylene naphthalate resin containing naphthalenedicarboxylic acid and butanediol as the main components is remarkable, so that the remarkable reduction of the generation of the organic gas containing tetrahydrofuran as the main component is possible.

Next, no particular restriction is put on the kind of monofunctional compound having a carboxyl group or a hydroxyl group for substituting the terminal of the polyester resin, but a compound having a low molecular weight easily volatilizes and flows out of the system without being introduced into the polymer terminal, depending upon a temperature, conditions of pressure reduction and the like at the time of the preparation of the polyester. Therefore, the preferable monofunctional compound is a compound having 7 or more carbon atoms. Examples of the particularly preferable compound include aromatic carboxylic acids such as benzoic acid, toluic acid, tert-butylbenzoic acid and naphthoic acid, their derivatives such as alkyl esters, and high-molecular weight alcohol compounds such as phenoxybenzyl alcohol.

In the present invention, there can be used the polyester in which a hydroxyl end group amount in a sample of the polyester resin obtained by polymerizing the above-mentioned monomer and the monofunctional compound which is determined by H-NMR is 40 meq/kg or less, preferably 20 meq/kg or less, and if the hydroxyl end group amount of the polyester resin is in excess of 40 meq/kg, the generation reduction effect of the gas is not sufficient.

Such a polyester resin can be obtained, for example, by stopping polymerization in a molting state at a step in which an intrinsic viscosity is in the range of 0.1 to 0.5 dl/g, once cooling and solidifying the polymer to obtain an intermediate polymer, and then carrying out the solid phase polymerization of the intermediate polymer at 180 to 210° C., whereby the intrinsic viscosity is in the range of 0.53 dl/g to 1.2 dl/g, preferably 1.0 dl/g or less.

In the case that the intrinsic viscosity is less than 0.53 dl/g, mechanical strength is low, and on the other hand, if it is more than 1.2 dl/g, moldability tends to be poor. Thus, either case is not preferable. Here, the intrinsic viscosity is a value obtained by measuring a 0.5% o-chlorophenol solution at 25° C.

Furthermore, the generation reduction effect of an organic gas can be observed irrespective of a carboxyl end group amount of the polyester resin of the component (A) used in the present invention, but it is preferable that the carboxyl end group amount is low, and it is particularly preferable that the carboxyl end group amount is in the range of 30 meq/kg or less.

In the present invention, the halogenated phenoxy compound (B) blended with the polyester resin (A) is a compound represented by the formula (1), and this compound may be prepared, for example, by a method which comprises reacting a halogenated bisphenol glycidyl ether with a halogenated bisphenol in the presence of a suitable catalyst by the use of a solvent as needed.

Examples of the halogenated bisphenol compound which is the constitutional components of the halogenated phenoxy compound represented by the above-mentioned formula (1) include 2,2-bis(3, 5-dibromo-4-hydroxyphenyl)propane, bis (3,5-dibromo-4-hydroxyphenyl)methane, bis(3,5-dibromo-4-hydroxyphenyl)phenylmethane, 1,1-bis(3,5-dibromo-4-hydroxyphenyl)ethane, bis(3,5-dibromo-4-hydroxyphenyl) sulfone, bis(3,5-dibromo-4-hydroxyphenyl) ether, bis(3,5-dibromo-4-hydroxyphenyl) ketone, bis(3,5-dibromo-4-hydroxyphenyl) sulfide, 2,2-bis(3,5-dichloro-4-hydroxyphenyl)propane, bis(3,5-dichloro-4-hydroxyphenyl)methane, bis(3,5-dichloro-4-hydroxyphenyl)sulfone and bis(3,5-dichloro-4-hydroxyphenyl) sulfide, and among them, 2, 2-bis(3,5-dibromo-4-hydroxyphenyl)propane which is usually called tetrabromophenol A is most preferable. A usual bisphenol compound such as 2,2-bis(4-hydroxyphenyl)propane, bis(4-hydroxyphenyl)sulfone or bis(4-hydroxyphenyl)methane can be used together with the halogenated bisphenol compound.

As the halogenated phenoxy compound (B) of the present invention, a compound in which an end group is usually a glycidyl group and/or a hydroxy group can be used, and a compound in which the end group is sealed with a carboxylic acid, a phenol, an amine or an alcohol can also be used.

Furthermore, a halogenated phenoxy compound (B) which can be used in the present invention has a number-average polymerization degree of 6 to 50, preferably 10 to 25, more preferably 10 to 20, as described above. In the case that the polymerization degree of the halogenated phenoxy compound is less than 6, a residence stability at the time of molding is poor, the gas generation amount increases, and a large amount of the composition is deposited in an extruder at the preparation of the composition, which often requires cleaning. On the contrary, if the polymerization degree is more than 50, the melting viscosity of the material increases, and the fluidity at the time of injection molding deteriorates, so that the moldability also deteriorates.

The amount of the halogenated phenoxy compound (B) according to the present invention is in the range of 1 to 50 parts by weight, preferably 5 to 30 parts by weight based on 100 parts by weight of the polyester resin. If the amount of the halogenated phenoxy compound is less than 1 part by weight, a sufficient flame-retardant effect cannot be obtained, and on the other hand, if it is more than 50 parts by weight, the mechanical properties and the thermal properties of the flame-retardant composition deteriorate. Thus, either case is not preferable.

Next, examples of an antimony compound (C) used in the present invention include antimony trioxide, antimony tetroxide, antimony pentoxide, antimony halides, and soda antimonate.

The amount of such a compound is in the range of 0.1 to 30 parts by weight, preferably 1 to 20 parts by weight based on 100 parts by weight of the polyester resin (A). If the amount is less than 0.1 part by weight, flame retardancy of the composition is poor, and if it is more than 30 parts by weight, the strength of the composition deteriorates. Thus, either case is not preferable.

In the present invention, an inorganic filler (D) is not an essential component, but in order to obtain a molded article which is excellent in performances such as mechanical strength, heat resistance, dimensional stability (deformation resistance and warpage resistance) and electrical properties, it is preferable to blend the inorganic filler. In compliance with a purpose, the filler can be used in the state of fibers, particles or plates.

Examples of the fibrous filler include inorganic fibrous substances such as glass fiber, carbon fiber, silica fiber, silica alumina fiber, zirconia fiber, boron nitride fiber, silicon nitride fiber, boron fiber, potassium titanate fiber, and fibrous fillers of metals such as stainless steel, aluminum, titanium, copper and brass. The particularly typical fibrous filler is the glass fiber or the carbon fiber.

On the other hand, examples of the particulate filler include carbon black, silica, quartz powder, silicates such as glass beads, glass powder, calcium silicate, aluminum silicate, kaolin, talc, clay, diatomaceous earth, wollastonite, metallic oxides such as iron oxide, titanium oxide, zinc oxide, alumina, metallic carbonates such as calcium carbonate, magnesium carbonate, metallic sulfates such as calcium sulfate, barium sulfate, silicon carbide, silicon nitride, boron nitride and various metal powders. In addition, examples of the plate-like filler include mica, glass flakes and various kinds of metallic foils.

These inorganic fillers can be used alone or in a combination of two or more thereof. A combination of the fibrous filler, particularly the glass fiber and the particulate filler and/or the plate-like filler is preferable to simultaneously obtain mechanical strength, dimensional accuracy and electrical properties.

In using these fillers, it is suitable to use greige goods or a finishing agent, if necessary. Examples of them include functional compounds such as epoxy compounds, isocyanate compounds, silane compounds and titanate compounds. These compounds may be subjected to a surface treatment or a converging treatment prior to use, or they may be simultaneously added at the preparation of the material.

In the present invention, the amount of the inorganic filler to be blended is in the range of 0 to 150 parts by weight, preferably 5 to 100 parts by weight based on 100 parts by weight of the polyester resin (A). If the amount of the inorganic filler is in excess of 150 parts by weight, molding is difficult and the mechanical strength of a molded article is insufficient. Moreover, the amount of the functional finishing agent to be simultaneously used is in the range of 0 to 10 wt %, preferably 0.05 to 5 wt % based on the inorganic filler.

The resin composition of the present invention can be supplementally blended with a small amount of another thermoplastic resin, so long as its object is not impaired. As the other thermoplastic resin which can be used herein, any thermoplastic resin is acceptable, so far as it is stable at a high temperature. Examples of the thermoplastic resin include polyamides, polystyrenes, polycarbonates, polyurethanes, polyphenylene oxide, polyphenylene sulfide, polybutadiene, butyl rubber and copolymers mainly comprising polyacrylates (inclusive of multi-layer graft copolymers), and they can be blended in an optional ratio in compliance with a purpose.

In order to further impart desired properties to the composition of the present invention in compliance with its purpose, some additives can be added to the composition. The additives are known substances which can usually be added to a thermoplastic resin, a thermosetting resin or the like, and examples of the additives include an antioxidant, stabilizers such as a heat stabilizer and an ultraviolet absorber, an antistatic agent, colorants such as a dye and a pigment, a lubricant, a plasticizer, a crystallization accelerator and a crystal nucleus agent.

The composition of the present invention can easily be prepared by the use of known facilities and a known method which can usually be used in a conventional preparation method of a resin composition. For example, there can be used any of (i) a method which comprises mixing each component, kneading and extruding the mixture by an extruder to form pellets, and then molding them, (ii) a method which comprises once forming pellets having different compositions, mixing predetermined amounts of the pellets, and then molding the mixture to obtain a molded article having a desired composition, and (iii) a method which comprises directly feeding one or more of each component to a molding machine. In addition, it is a preferable method for the purpose of uniformly blending these components that a part of the resin components is formed in the state of a fine powder and this powder is mixed with the other components, then the mixture is added to the remains of the resin.

EXAMPLES

Now, the present invention will be described in detail with reference to examples, but the scope of the present invention should not be limited to these examples, so long as it is not beyond its gist. In this connection, methods for measuring characteristics on the basis of which evaluation is made are as follows.

(1)Measurement method of generation amount of gas

A sample was prepared by injection-molding pellets comprising each of compositions in Tables 2 and 3 to form a test piece for an ASTM tensile test, and then grinding it. 5 g of the sample was placed in a head space, and then allowed to stand at 150° C. for 1 hour. A generated gas was measured by gas chromatography. The weight of the generated gas to the weight of the sample was represented by ppm. Measurement conditions were as follows.

Device :HP5890A

Column :HR-1701, 0.32 mm diameter×30 m

Column Temp.:50° C. (1 min)→5° C./min→250° C.

Detector :FID (2)Fluidity

Measurement method of fluidity (bar flow fluid length)

A thin test piece (width 5 mm×thickness 0.5 mm) was formed by molding pellets comprising each of the compositions in Tables 2 and 3 by the use of a molding machine under the following conditions, and the fluidity was evaluated on the basis of its fluid length:

Cylinder temp. : 260° C.

Injection pressure:74 MPa

Mold temp. :60° C.

(3)Tensile strength

The tensile strength was measured in accordance with ASTM D-638.

(4)Flame retardancy test (UL-94)

For flame retardancy and dropping properties at the combustion of a resin, 5 test pieces (thickness=1/32 inch) were tested in accordance with Subject 94 (UL94) of Underwriters Laboratories.

(5)Residence stability

The residence stability was evaluated by comparing degrees of gelation by a halogenated phenoxy on the basis of melt flow indexes at residence times in a molding machine.

The molding machine used herein was J75 made by Nippon Seikousho Co., Ltd., and a cylinder temperature was set to 260° C. and molded articles were obtained under conditions of no residence and after a residence time of 15 minutes. These molded articles were ground, and melt flow rates were then measured under a load of 2160 g at 235° C.

When the melt flow rate of the molded article after a residence time of 15 minutes was lower than that of the molded article of no residence time, it was supposed that the gelation progressed, and the molded article was judged to be NG (×).

Examples 1 to 5, Comparative Examples 1 to 9

Polyester resins having characteristics shown in Table 1 were used to prepare materials of examples shown in Table 2 and comparative examples shown in Table 3, and their properties were evaluated and the results are shown in Tables 2 and 3. The preparation method of the materials will be described as follows.

[Synthesis method of the resin]

Preparation Example 1 (A-1)

2178 g of dimethyl terephthalate, 1415 g of butanediol, 1.25 g of tetrabutyl titanate and 81.5 g of p-tert-butylbenzoic acid were introduced into a reaction vessel equipped with a stirrer and a fractionating tower. Next, ester interchange and an esterification reaction were carried out, while the solution was heated from 140° C. to 200° C. over 90 minutes. At this time, the amounts of methanol and water reached about 90% of theoretical amounts. Here, a flow route was exchanged to a direct cooling tower connecting from the fractionating tower to a vacuum pump, and pressure was then slowly reduced, while the solution was heated from 200° C. to 250° C., so that 0.5 torr was reached in about 40 minutes. A polymerization reaction was carried out at 250° C. under 0.5 torr for 2 hours, and the resulting polymer was taken out and then pelletized. An IV of this polymer was 0.34 dl/g. This was subjected to a solid phase polymerization in an atmosphere of nitrogen at 200° C. for 30 hours to obtain a polymer A-1. An IV of the thus obtained polymer was 0.56 dl/g, and a hydroxyl end group amount was 14 meq/kg, and a carboxyl end group amount was 26 meq/kg.

Preparation Example 2 (A-2)

2178 g of dimethyl terephthalate, 1415 g of butanediol, 1.25 g of tetrabutyl titanate and 18.4 g of p-tert-butylbenzoic acid were introduced into a reaction vessel equipped with a stirrer and a fractionating tower. Next, ester interchange and an esterification reaction were carried out, while the solution was heated from 140° C. to 200° C. over 90 minutes. At this time, the amounts of methanol and water reached about 90% of theoretical amounts. Here, a flow route was exchanged to a direct cooling tower connecting from the fractionating tower to a vacuum pump, and pressure was then slowly reduced, while the solution was heated from 200° C. to 250° C., so that 0.5 torr was reached in about 40 minutes. A polymerization reaction was carried out at 250° C. under 0.5 torr for 2 hours, and the resulting polymer was taken out and then pelletized. An IV of this polymer was 0.50 dl/g. This was subjected to a solid phase polymerization in an atmosphere of nitrogen at 200° C. for 30 hours to obtain a polymer A-2. An IV of the thus obtained polymer was 0.86 dl/g, and a hydroxyl end group amount was 15 meq/kg, and a carboxyl end group amount was 46 meq/kg.

Preparation Example 3 (A-3)

2178 g of dimethyl terephthalate, 1415 g of butanediol, 1.25 g of tetrabutyl titanate and 89.1 g of p-tert-butylbenzoic acid were introduced into a reaction vessel equipped with a stirrer and a fractionating tower. Next, ester interchange and an esterification reaction were carried out, while the solution was heated from 140° C. to 200° C. over 90 minutes. At this time, the amounts of methanol and water reached about 90% of theoretical amounts. Here, a flow route was exchanged to a direct cooling tower connecting from the fractionating tower to a vacuum pump, and pressure was then slowly reduced, while the solution was heated from 200° C. to 250° C., so that 0.5 torr was reached in about 40 minutes. A polymerization reaction was carried out at 250° C. under 0.5 torr for 2 hours, and the resulting polymer was taken out and then pelletized. An IV of this polymer was 0.30 dl/g. This was subjected to a solid phase polymerization in an atmosphere of nitrogen at 200° C. for 30 hours to obtain a polymer A-3. An IV of the thus obtained polymer was 0.56 dl/g, and a hydroxyl end group amount was 12 meq/kg, and a carboxyl end group amount was 16 meq/kg.

Preparation Example 4 (A-4)

2232 g of dimethyl naphthalate, 1153 g of butanediol, 1.25 g of tetrabutyl titanate and 65.5 g of p-tert-butylbenzoic acid were introduced into a reaction vessel equipped with a stirrer and a fractionating tower. Next, ester interchange and an esterification reaction were carried out, while the solution was heated from 140° C. to 220° C. over 90 minutes. At this time, the amounts of methanol and water reached about 90% of theoretical amounts. Here, a flow route was exchanged to a direct cooling tower connecting from the fractionating tower to a vacuum pump, and pressure was then slowly reduced, while the solution was heated from 220° C. to 260° C., so that 0.5 torr was reached in about 30 minutes. A polymerization reaction was carried out at 260° C. under 0.5 torr for 1.5 hours, and the resulting polymer was taken out and then pelletized. An IV of this polymer was 0.50 dl/g. This was subjected to a solid phase polymerization in an atmosphere of nitrogen at 200° C. for 30 hours to obtain a polymer A-4. An IV of the thus obtained polymer was 0.57 dl/g, and a hydroxyl end group amount was 13 meq/kg, and a carboxyl end group amount was 38 meq/kg.

Reference Examples 5 to 8 (A'-1 to 4)

A melting polymerization was carried out by the use of the same reaction vessel as in Preparation Example 1 under conditions for the preparation of a usual polyester from a dicarboxylic acid derivative and an aliphatic diol, thereby obtaining resins. If necessary, the resins obtained by this melting polymerization were subjected to a solid phase polymerization at 200° C. in an atmosphere of nitrogen, whereby the resins were set to desired polymerization degrees.

|Preparation method of pellets|

(A) Predetermined amounts of components (B), (C) and (D) were blended with a polyester resin of a component (A), and they were then uniformly mixed by a V blender. A predetermined amount of a glass fiber was side-fed to the resulting mixture by a twin-screw extruder having a diameter of 30 mm, and they were molten and mixed at a barrel temperature of 260° C. Next, a strand extruded through a die was cooled and cut to obtain pellets.

TABLE 1

| No. | Resin | IV (dl/g) | Hydroxyl End Group Amount (meq/kg) | Carboxyl End Group Amount (meq/kg) |
| --- | --- | --- | --- | --- |
| A-1 | Polybutylene terephthalate resin terminal-treated with p-tert-butylbenzoic acid | 0.56 | 14 | 26 |
| A-2 | Polybutylene terephthalate resin terminal-treated with p-tert-butylbenzoic acid | 0.86 | 15 | 46 |
| A-3 | Polybutylene terephthalate resin terminal-treated with p-tert-butylbenzoic acid | 0.56 | 12 | 16 |
| A-4 | Polybutylene terephthalate resin terminal-treated with p-tert-butylbenzoic acid | 0.57 | 13 | 38 |
| A'-1 | Polybutylene terephthalate | 0.56 | 130 | 45 |
| A'-2 | Polybutylene terephthalate | 0.86 | 82 | 51 |
| A'-3 | Polybutylene naphthalate | 0.55 | 125 | 48 |
| A'-4 | Polybutylene naphthalate | 0.56 | 15 | 155 |

TABLE 2

| | | | Example | | | | |
| --- | --- | --- | --- | --- | --- | --- | --- |
| | | | 1 | 2 | 3 | 4 | 5 |
| Composition | | | | | | | |
| (A) Polyester Resin | No. | | A-1 | A-2 | A-3 | A-4 | A-2 |
| | pts. wt. | | 100 | 100 | 400 | 100 | 100 |
| (B) Halogenated phenoxy resin | No. | | B-1 | B-1 | B-2 | B-2 | B-1 |
| | pts. wt. | | 20 | 20 | 20 | 20 | 25 |
| (C) Antimony trioxide | pts. wt. | | 10 | 10 | 10 | 10 | 10 |
| (D) Glass fiber | pts. wt. | | 60 | 60 | 60 | 60 | — |
| Quality | | | | | | | |
| Flame retardancy | — | | V-0 | V-0 | V-0 | V-0 | V-0 |
| Amount of generated gas | ppm | | 5.2 | 4.8 | 2.5 | 6.8 | 6.5 |

TABLE 2-continued

|  |  | Example | | | | |
|---|---|---|---|---|---|---|
|  |  | 1 | 2 | 3 | 4 | 5 |
| Fluidity | mm | 28 | 23 | 35 | 32 | 28 |
| Tensile strength | MPa | 138 | 141 | 134 | 136 | 53 |
| Residence stability | — | ○ | ○ | ○ | ○ | ○ |

Notes:
Halogenated phenoxy compound:
B-1: A halogenated phenoxy resin having a polymerization degree of 13
B-2: A halogenated phenoxy resin having a polymerization degree of 18
B-3: A halogenated phenoxy resin having a polymerization degree of 3
B-4: A halogenated phenoxy resin having a polymerization degree of 80
Antimony trioxide: PATOX-M manufactured by Nippon Seikou Co., Ltd.

TABLE 3

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Composition |  |  |  |  |  |  |  |  |  |  |
| (A) Polyester Resin | No. | A-1 | A-1 | A'-2 | A'-1 | A'-3 | A'-2 | A'-4 | A-1 | A-1 |
|  | pts. wt. | 100 | 100 | 100 | 100 | 100 | 100 | 100 | 100 | 100 |
| (B) Halogenated phenoxy resin | No. | B-1 | — | B-1 | B-2 | B-2 | B-1 | B-1 | B-3 | B-4 |
|  | pts. wt. | 20 | — | 20 | 20 | 20 | 25 | 20 | 20 | 20 |
| (C) Antimony trioxide | pts. wt. | — | 10 | 10 | 10 | 10 | 10 | 10 | 10 | 10 |
| (D) Glass fiber | pts. wt. | 60 | 60 | 60 | 60 | 60 | — | 60 | 60 | 60 |
| Quality |  |  |  |  |  |  |  |  |  |  |
| Flame retardancy | — | HB | HB | V-0 | V-0 | V-0 | V-0 | V-0 | V-0 | V-0 |
| Amount of generated gas | ppm | 4.3 | 5.1 | 24 | 32 | 43 | 35 | 15 | 5.6 | 5.3 |
| Fluidity | mm | 38 | 42 | 23 | 28 | 30 | 28 | 28 | 30 | 22 |
| Tensile strength | MPa | 136 | 137 | 142 | 135 | 136 | 53 | 136 | 138 | 134 |
| Residence stability | — | ○ | ○ | ○ | ○ | ○ | ○ | ○ | x | ○ |

Notes:
The same as in Table 2.

I claim:

1. A flame-retardant polyester resin composition comprising:

(A) 100 parts by weight of a polyester resin selected from (a1) polybutylene terephthalate resin comprised of terephthalic acid and butanediol, or (a2) a polybutylene naphthalate resin comprised of naphthalenedicarboxylic acid and butanediol, each end of said polyester resin being substituted with a monofunctional compound having carboxyl group or a hydroxyl group, the amount of the hydroxyl end group being 40 meq/kg or less, (B) 1 to 50 parts by weight of a halogenated phenoxy compound having repeating units represented by the formula (1), the number-average degree of polymerization thereof being 6 to 50:

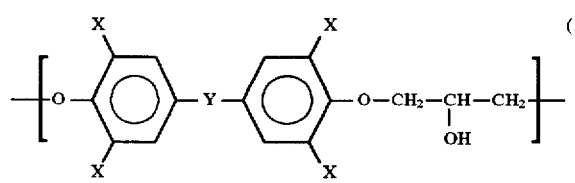
(1)

wherein X represents Br or Cl, and Y represents $C_{1-10}$ alkylene group, $C_{1-10}$ alkylidene group, $C_{3-10}$ cycloalkane group, carbonyl group, —O—, —S— or —SO$_2$—, (C) 0.1 to 30 parts by weight of an antimony compound, and (D) 0 to 150 parts by weight of an inorganic filler.

2. The composition as in claim 1, wherein the monofunctional compound is an organic compound having 7 or more carbon atoms and a carboxyl group or a hydroxyl group.

3. The composition of claim 1, wherein the monofunctional compound is a compound selected from benzoid acid, toluic acid, tert-butylbenzoic acid, napthoic acid, phenoxybenzyl alcohol or derivatives thereof.

4. The composition of claim 1, wherein the polyester resin (A) has a carboxyl end group content of 30 meq/kg or less.

5. A molded article for an electric or electronic component which is formed of the composition of claim 1.

* * * * *